(12) United States Patent
Aoki (10) Patent No.: US 11,225,058 B2
(45) Date of Patent: Jan. 18, 2022

(54) LAMINATED GLASS

(71) Applicant: AGC Inc., Chiyoda-ku (JP)

(72) Inventor: Tokihiko Aoki, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 44 days.

(21) Appl. No.: 16/729,639

(22) Filed: Dec. 30, 2019

(65) Prior Publication Data

US 2020/0130326 A1 Apr. 30, 2020

Related U.S. Application Data

(63) Continuation of application No. PCT/JP2018/028128, filed on Jul. 26, 2018.

(30) Foreign Application Priority Data

Jul. 31, 2017 (JP) .............................. JP2017-147596

(51) Int. Cl.
*B32B 17/10* (2006.01)
*B32B 7/02* (2019.01)

(52) U.S. Cl.
CPC .......... *B32B 17/10036* (2013.01); *B32B 7/02* (2013.01); *B32B 17/10293* (2013.01); *B32B 17/10605* (2013.01); *B32B 17/10633* (2013.01); *B32B 2250/03* (2013.01); *B32B 2307/102* (2013.01); *B32B 2307/412* (2013.01); *B32B 2307/416* (2013.01); *B32B 2605/006* (2013.01)

(58) Field of Classification Search
None
See application file for complete search history.

(56) References Cited

U.S. PATENT DOCUMENTS

| 5,364,820 | A | * | 11/1994 | Morimoto | ............... | C03C 3/095 |
| | | | | | | 501/69 |
| 2016/0361898 | A1 | | 12/2016 | Sadakane et al. | | |
| 2017/0122027 | A1 | | 5/2017 | Bumann et al. | | |
| 2017/0190152 | A1 | | 7/2017 | Notsu et al. | | |
| 2018/0001598 | A1 | | 1/2018 | Mikayama et al. | | |

FOREIGN PATENT DOCUMENTS

| JP | 2008-230894 A | 10/2008 |
| JP | 2017-65966 A | 4/2017 |
| JP | 2017-121804 A | 7/2017 |
| JP | 2017-520497 A | 7/2017 |
| WO | WO 2014/098160 A1 | 6/2014 |
| WO | WO 2015/137211 A1 | 9/2015 |
| WO | WO 2016/158696 A1 | 10/2016 |

OTHER PUBLICATIONS

English translation of WO 2014/098160 A1 (Year: 2014).*
International Search Report dated Oct. 16, 2018 in PCT/JP2018/028128 filed Jul. 26, 2018, 2 pages.

* cited by examiner

*Primary Examiner* — Ramsey Zacharia
(74) *Attorney, Agent, or Firm* — Oblon, McClelland, Maier & Neustadt, L.L.P.

(57) ABSTRACT

To provide a laminated glass excellent in edge foaming resistance and rigidity. Laminated glass 1 in which a pair of glass plates and an intermediate film 4 provided between the pair of glass plates, are laminated, wherein the shear storage modulus of said intermediate film 4 is from 2 to 100 MPa, and the outer peripheral edge of the intermediate film 4 is present inside than the outer peripheral edges of the two glass plates constituting said pair of glass panels, at least at a part of the entire outer periphery of the laminated glass 1.

18 Claims, 2 Drawing Sheets

LAMINATED GLASS

TECHNICAL FIELD

The present invention relates to a laminated glass.

BACKGROUND ART

A laminated glass having an intermediate film of e.g. a resin provided between a pair of glass plates is excellent in safety, since fragments do not scatter upon breakage, and thus, it is widely used in e.g. windowpanes of vehicles or buildings. In recent years, a laminated glass having various functions imparted in addition to the safety such as the scattering prevention, has been used. In particular, demand for glass having lightweight and both rigidity and sound insulation satisfied, is high. Patent Document 1 has proposed a laminated glass having rigidity and sound insulation satisfied while being light in weight, by letting it have an intermediate film of which the shear storage modulus and loss factor are within specific ranges.

PRIOR ART DOCUMENT

Patent Document

Patent Document 1: JP-A-2017-65966

DISCLOSURE OF INVENTION

Technical Problem

However, the laminated glass excellent in rigidity as disclosed in Patent Document 1, has had such a problem that a plasticizer contained in the intermediate film tends to bleed out by the influence of heat, light and water, whereby edge foaming is likely to occur at the edge portion of the intermediate film.

The present invention has been made in view of the above problem, and an object thereof is to provide a laminated glass excellent in edge foaming resistance and rigidity.

Solution to Problem

The present inventors have conducted intensive studies in order to solve the above problem, and as a result, they have found that the intermediate film for a laminated glass excellent in rigidity has a problem that since a plasticizer contained in the intermediate film is likely to bleed out, it is difficult to maintain the plasticizer, and have arrived at the present invention.

That is, the present invention provides a laminated glass in which a pair of glass plates and an intermediate film containing a plasticizer, provided between the pair of glass plates, are laminated, characterized in that the shear storage modulus G' of the intermediate film is from 2 to 100 MPa, and the outer peripheral edge of the intermediate film is present inside than the outer peripheral edges of the two glass plates constituting the pair of glass plates, at least at a part of the entire outer periphery of the laminated glass.

Advantageous Effects of Invention

According to the present invention, it is possible to provide a laminated glass excellent in edge foaming resistance and rigidity.

DESCRIPTION OF EMBODIMENTS

Hereinafter, embodiments of the present invention will be described, but the present invention is not limited to the following embodiments. In this specification, unless otherwise specified, "to" showing a numerical range is used in the sense of including the numerical values given before and after it as the lower limit value and the upper limit value.

Figure 1:
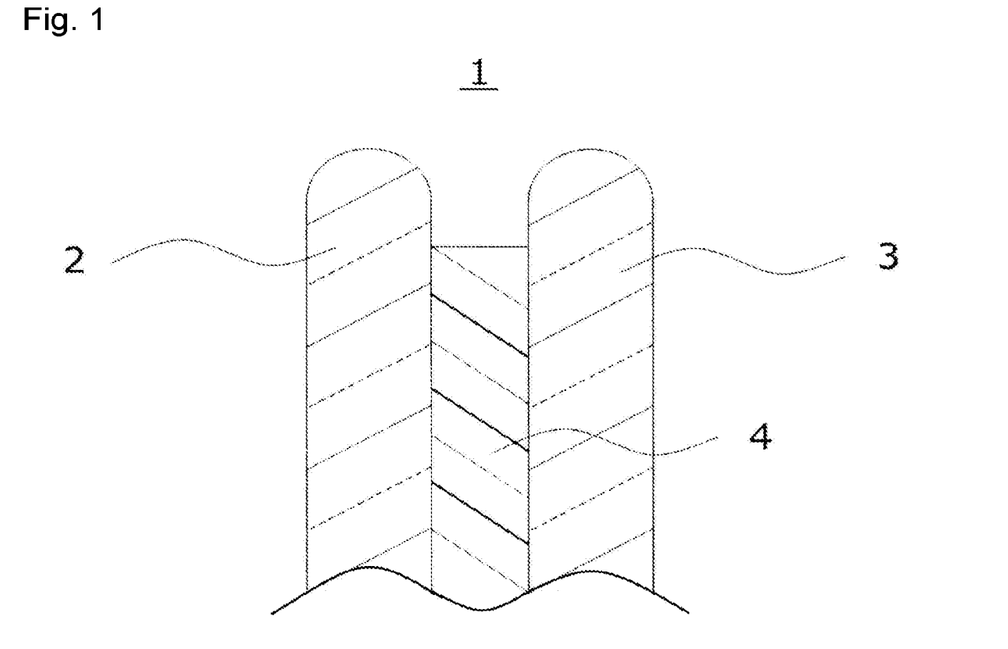
FIG. 1 is a partial schematic cross-sectional view of the edge portion, showing an example of the laminated glass 1 of the present invention.

FIG. 1 is a partial cross-sectional view of the edge portion, showing an example of the laminated glass 1 of the present invention. The laminated glass 1 is a laminated glass in which a pair of glass plates comprising a first glass plate 2 and a second glass plate 3, and an intermediate film 4 provided between the pair of glass plates, are laminated. The outer peripheral edge of the intermediate film 4 is present inside i.e. on the side closer to the central portion in pane of the laminated glass, than the outer peripheral edges of the first glass plate 2 and the second glass plate 3. The outer peripheral edges of the first glass plate 2 and the second glass plate 3 are substantially the same, i.e. the outer peripheral edges of the first glass plate 2 and the second glass plate 3 correspond to the outer peripheral edge of the laminated glass 1.

Figure 2:
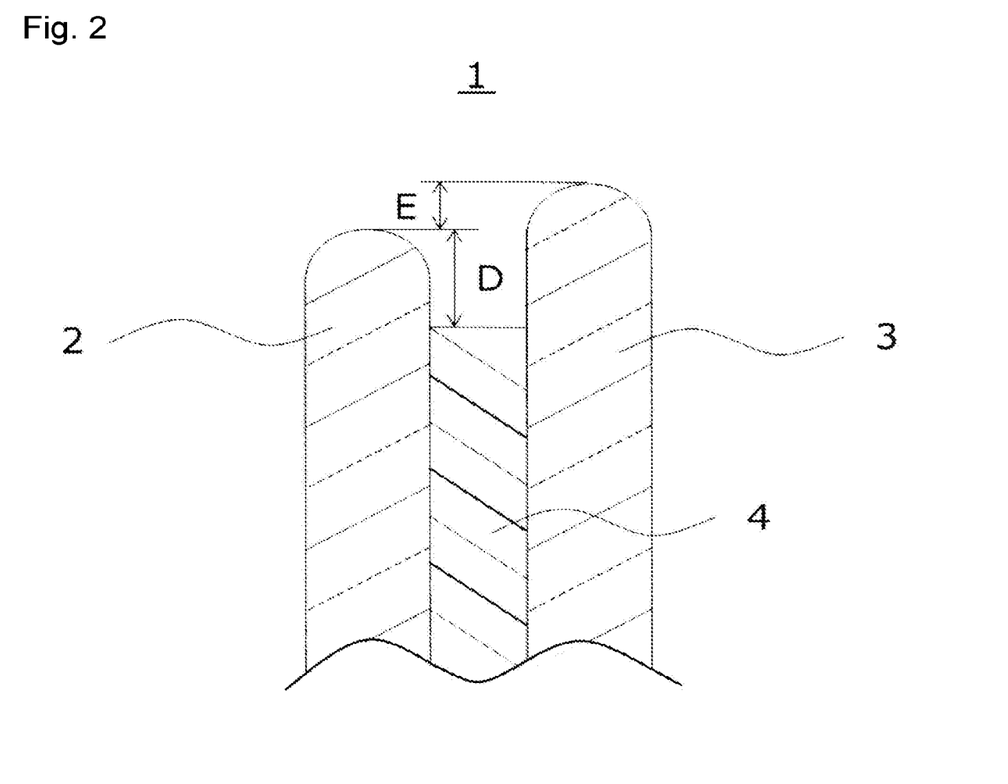
FIG. 2 is a partial schematic cross-sectional view of the edge portion, showing an example of the laminated glass 1 of the present invention.

FIG. 2 is a partial cross-sectional view showing another example of an edge portion of the laminated glass 1 of the present invention.

Here, D represents the distance between the outer peripheral edge of the intermediate film 4 and the outer peripheral edge of the two glass plates constituting the pair of glass plates, i.e. the protruding length of the first glass plate 2 or the protruding length of the second glass plate 3 (hereinafter referred to also as the protruding length D), and in a case where the protruding length of the first glass plate 2 and the protruding length of the second glass plate 3 are different, it refers to the length of the shorter one.

Further, E represents the distance between the outer peripheral edge of the first glass plate 2 and the outer peripheral edge of the second glass plate 3 (hereinafter referred to also as the plate displacement width E).

In a case where the laminated glass 1 is used for a vehicle, the first glass plate 2 is disposed inside of the vehicle, and the second glass plate 3 is disposed outside of the vehicle. In a case where the laminated glass 1 is used for a building, the first glass plate 2 is disposed on the indoor side, and the second glass plate 3 is disposed on the outdoor side.

Figure 3:
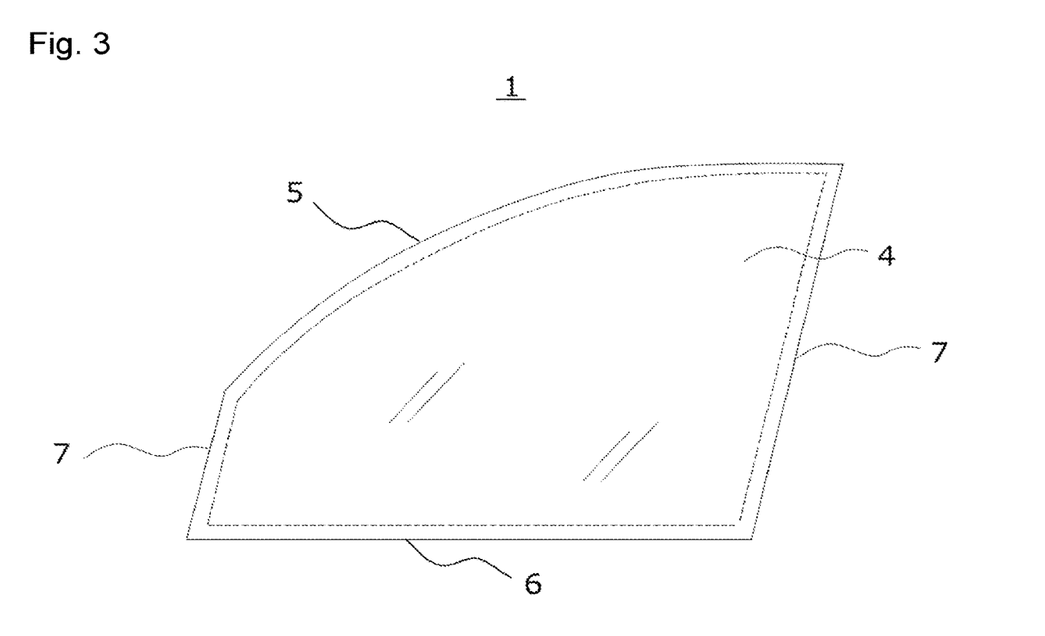
FIG. 3 is a schematic front view showing an example of the laminated glass 1 of the present invention.

FIG. 3 is a front view showing an example of the laminated glass 1 of the present invention, and shows a side glass for a vehicle as an example, but the laminated glass 1 of the present invention is not limited to the side glass of a vehicle. The laminated glass 1 has a upper portion 5, a lower portion 6 and two side portions 7. The outer peripheral edge of the laminated glass 1 is formed of the upper portion 5, the lower portion 6 and the two side portions 7. The dashed line indicating the outer peripheral edge of the intermediate film 4, is present inside than the entire outer peripheral edge of the laminated glass 1.

(Laminated Glass)

The laminated glass 1 of the present invention is a laminated glass in which a pair of glass plates, and an intermediate film 4 provided on the pair of glass plates, are laminated, wherein the shear storage modulus G' of the intermediate film 4 is from 2 to 100 MPa. Further, the outer peripheral edge of the intermediate film 4 is present inside than the outer peripheral edge of the two glass plates constituting the pair of glass plates, at least at a part of the outer peripheral edge of the laminated glass 1.

The laminated glass 1 of the present invention having the above construction is excellent in edge foaming resistance. Although the reason is not clear, but it is considered to be as follows.

With a laminated glass using an intermediate film of which the shear storage modulus G' is from 2 to 100 MPa, edge foaming is likely to occur along with long-term use, as compared with a laminated glass using an intermediate film of which the shear storage modulus G' is less than 2 MPa. Edge foaming occurs as a plasticizer contained in the intermediate film bleeds out by the influence of ultraviolet rays, heat and water. Therefore, in the laminated glass 1 of the present invention, by letting the outer peripheral edge of the intermediate film 4 be present on the inner side than the outer peripheral edge of the two glass plates constituting the pair of glass plates, it is possible to protect the edge portion of the intermediate film 4 from heat and ultraviolet rays. By this protective effect, the plasticizer contained in the intermediate film 4 tends to be less likely to bleed out, and thus, the laminated glass 1 of the present invention is excellent in edge foaming resistance.

In FIG. 3, the dashed line indicating the outer peripheral edge of the intermediate film 4 is present inside than the entire outer periphery of the laminated glass 1. That is, the outer peripheral edge of the intermediate film 4 is present inside from the outer peripheral edge of the two glass plates constituting the pair of glass plates, at the entire outer periphery of the laminated glass 1. However, the outer peripheral edge of the intermediate film 4 being inside than the outer peripheral edge of the two glass plates constituting the pair of glass plates may be a part of the entire outer periphery of the laminated glass 1. That is, a laminated glass 1 in which the outer peripheral edge of the intermediate film 4 is present inside than the outer peripheral edge of the two glass plates constituting the pair of glass plates, at least at a part of the entire outer periphery of the laminated glass 1, will have good edge foaming resistance, since the edge portion of the intermediate film 4 will be protected from heat and ultraviolet rays, at that part. In a laminated glass 1, the construction of the present invention may be applied to a portion where edge foaming resistance is required.

As mentioned above, the protruding length D shown in FIG. 2 is meant for the length of the shorter one as between the protruding length of the first glass plate 2 and the protruding length of the second glass plate 3. The protruding length of the first glass plate 2 is meant for the shortest distance between a straight line passing through the top edge portion of the first glass plate 2 and being parallel to the thickness direction and a straight line passing through the top edge portion of the intermediate film 4 and being parallel to the thickness direction. The protruding length of the second glass plate 3 is meant for the shortest distance between a straight line passing through the top edge portion of the second glass plate 3 and being parallel to the thickness direction and a straight line passing through the top edge portion of the intermediate film 4 and being parallel to the thickness direction.

In the laminated glass 1, the proportion of the outer periphery where the outer peripheral edge of the intermediate film 4 is inside than the outer peripheral edge of the two glass plates constituting the pair of glass plates, is preferably at least 20% of the entire outer periphery of the laminated glass 1. When the proportion of said outer periphery is at least 20%, the edge portion of the intermediate film 4 is protected from heat and ultraviolet rays, whereby the edge foaming resistance will be excellent. The proportion of said outer periphery is more preferably at least 30%, further preferably at least 40%, particularly preferably at least 50%.

The outer peripheral edge of the intermediate film 4 is present inside preferably by from 0.2 to 1.0 mm than the outer peripheral edge of the two glass plates constituting the pair of glass plates, i.e. the protruding length D is preferably from 0.2 to 1.0 mm, more preferably from 0.3 to 0.8 mm, further preferably from 0.4 to 0.7 mm. When the protruding length D is at least the lower limit value, the edge portion of the intermediate film 4 tends to be easily protected from heat and ultraviolet rays, whereby it is possible to increase the edge foaming resistance of the laminated glass 1, and when the protruding length D is at most the upper limit value, the edge portion of the intermediate film 4 tends to be hardly noticeable, and the design properties as a laminated glass will be improved.

In a case where the laminated glass 1 is installed in a vehicle, for example, as a window glass for a vehicle, it is preferred that at least a part of the upper portion of at least one of the pair of glass plates is protruded from the outer peripheral edge of the intermediate film 4. For example, in a case where the laminated glass 1 as shown in FIG. 3 is used as a side glass for a vehicle, the upper portion 5 of the laminated glass 1 is exposed during lifting and lowering, and thus is susceptible to the influence of heat or ultraviolet rays, as compared to the lower portion and the side edge portions. Therefore, when the pair of glass plates are protruded relative to the intermediate film 4, at the upper portion 5 of the laminated glass 1, it is possible to increase the edge foaming resistance of the laminated glass 1 in the application to a side glass for a vehicle. Further, when the pair of glass plates are protruded relative to the intermediate film 4 at the side edge portions of the laminated glass 1, for the same reason as at the upper portion, it is possible to increase the edge foaming resistance of the laminated glass 1 in the application to a side glass for a vehicle.

In this specification, the "upper portion" and the "lower portion" are meant for sides which become the upper side and the lower side when mounted on a vehicle, and the "side edge portions" are meant for other two sides. Further, the "upper portion" is meant for a region in the vicinity of the upper side of the laminated glass, and the "lower portion" is meant for a region in the vicinity of the lower side of the laminated glass.

The pair of glass plates are preferably such that the outer peripheral edge of one of the glass plates, is present inside than the outer peripheral edge of the other glass plate, i.e. there is preferably a plate displacement between the pair of glass plates. When there is a plate displacement between the pair of glass plates, the edge portion of the intermediate film 4 can be more effectively protected from heat and ultraviolet rays, whereby it is possible to further improve the edge foaming resistance of the laminated glass 1. For example, in a case where the laminated glass 1 is used in an application for a vehicle or in an application for a building, it is preferred that the outer peripheral edge of the glass plate on the in-vehicle side or the indoor side is present inside (on the side closer to the central portion in plane of the laminated glass) than the outer peripheral edge of the glass plate on the exterior side or the outdoor side. With such a structure, the edge portion of the intermediate film 4 will be most effectively protected from heat and ultraviolet rays entering from the outside or the outdoor, whereby it is possible to improve the edge foaming resistance of the laminated glass 1.

As shown in FIG. 2, the plate displacement width E is meant for the shortest distance between a straight line passing through the top edge portion of the first glass plate 2 and being in parallel to the thickness direction, and the straight line passing through the top edge portion of the second glass plate 3 and being in parallel to the thickness direction. That is, E corresponds to the difference between the protruding length of the first glass plate 2 and the protruding length of the second glass plate 3.

The plate displacement width E of the pair of glass plates is preferably from 0.2 to 0.8 mm, more preferably from 0.3 to 0.7 mm, further preferably from 0.3 to 0.6 mm. When the plate displacement width E is at least the lower limit value, the edge portion of the intermediate film 4 can be more effectively protected from heat and ultraviolet rays, whereby it is possible to improve the edge foaming resistance of the laminated glass 1. When the plate displacement width E is at most the upper limit value, the edge portions of the intermediate film 4 and the first glass plate 2 tend to be less likely to be noticeable, whereby the design properties as a laminated glass will be improved.

The laminated glass 1 is preferably such that the visible light transmittance as measured in accordance with JIS R3106:1998 is at least 70%. When the visible light transmittance is at least 70%, the visibility can be sufficiently secured, and various sensors to be installed on the glass plate can be made to sufficiently function.

The laminated glass 1 is preferably such that the solar transmittance $T_e$ measured in accordance with JIS R3106:1998 is preferably from 5 to 60%, more preferably from 35 to 55%. When the solar transmittance $T_e$ is within the above range, it is possible to increase the heat shielding properties of the laminated glass 1.

It is preferred that the laminated glass 1 further has a functional film or a functional membrane. The functional film or functional membrane may be provided between the first glass plate 2 and the intermediate film 4, inside of the intermediate film 4, or between the second glass plate 3 and the intermediate film 4. The functional film may be a ultraviolet cutoff film or an infrared cutoff film. The functional membrane may be a ultraviolet cutoff membrane or an infrared cutoff membrane. The infrared cutoff membrane may be a multilayer membrane of a structure wherein a layer composed mainly of silver is sandwiched between dielectric layers. The ultraviolet cutoff membrane may be a silica membrane containing a ultraviolet absorber.

In the laminated glass 1, the spacing between the first glass plate 2 and the second glass plate 3 preferably becomes smaller towards the outer peripheral edge from the central portion in plane. By such a construction, a plasticizer in the intermediate film 4 tends to be less likely to bleed out by ultraviolet rays, heat and water, and the edge foaming resistance will be improved.

(Glass Plates)

For the first glass plate 2 and the second glass plate 3 constituting the pair of glass plates, white type soda lime glass, green type colored soda lime glass, UV-shielding colored soda lime glass, heat ray absorbing colored soda lime glass, chemically strengthened aluminosilicate glass, etc. can be used. The heat ray absorbing colored soda lime glass has a composition having the content ratio of the total iron oxide, the content ratio of $TiO_2$ and the content ratio of $CeO_2$ increased from the composition of white-type glass. The total iron amount calculated as $Fe_2O_3$ is preferably from 0.5 to 1.0 mass %. Thus, the laminated glass 1 will be excellent in heat shielding properties, and it is possible to obtain a visible light transmittance required for safety. Further, the ratio of divalent iron oxide in the total iron amount (referred to also as the redox) is preferably from 20 to 30 mass %, more preferably from 22 to 27 mass %, further preferably from 24 to 25 mass %.

At least one glass plate of the first glass plate 2 and the second glass plate 3, is such that the ultraviolet transmittance $T_{uv}$ as measured in accordance with ISO9845-1:1992, is preferably at most 65%, more preferably at most 60%. When $T_{uv}$ is at most the above upper limit value, the edge portion of the intermediate film 4 can be more effectively protected from ultraviolet rays, whereby it is possible to increase the edge foaming resistance of the laminated glass 1. Here, even when only $T_{uv}$ of the second glass plate 3 disposed on the exterior side of a vehicle is at most 65%, the same effect can be obtained.

At least one glass plate of the first glass plate 2 and the second glass plate 3, is such that the solar transmittance $T_e$ as measured in accordance with JIS R3106:1998, is preferably at most 75%, more preferably at most 70%. When $T_e$ is at most the above upper limit value, the edge portion of the intermediate film 4 can be more effectively protected from heat, whereby it is possible to increase the edge foaming resistance of the laminated glass 1. Here, even when $T_e$ of the first glass plate 2 disposed on the interior side of a vehicle is at most the above upper limit value, the same effect can be obtained.

The second glass plate 3 disposed on the exterior side of a vehicle is such that the thickness is at least 1.6 mm, more preferably at least 2.0 mm, particularly preferably at least 2.2 mm. When the thickness of the second glass plate 3 is at least 1.6 mm, it can be provided with impact resistance against a flying object such as a pebble. Further, in a case where the second glass plate 3 has a composition that absorbs ultraviolet rays, the edge foaming of the intermediate film 4 will be effectively suppressed. The second glass plate 3 is such that the thickness is at most 3.0 mm, more preferably at most 2.5 mm, further preferably at most 2.1 mm. When the thickness of the second glass plate 3 is at most the above upper limit value, the laminated glass 1 can be made light in weight.

The first glass plate 2 disposed on the interior side of a vehicle is such that the thickness is preferably from 0.6 to 2.0 mm, more preferably from 1.2 to 1.6 mm. Within the above range, it is possible to secure the sound insulation at from 2,000 to 5,000 Hz which is a frequency range of sounds easy for the human to hear.

The difference in thickness between the first glass plate 2 and the second glass plate 3 is preferably at most 0.7 mm, more preferably at most 0.4 mm. When the difference in thickness between the first glass plate 2 and the second glass plate 3 is at most 0.7 mm, the sound insulation in the frequency range of from 2,500 to 5,000 Hz will be good.

The periphery of the outer peripheral edges of the first glass plate 2 and the second glass plate 3, is preferably chamfered. The chamfered surface will scatter ultraviolet rays, whereby a plasticizer in the intermediate film 4 tends to be less likely to bleed out. For the chamfering, for example, by a rotating grindstone, the chamfering is performed. On the outer peripheral surface of the rotating grindstone, a circular grinding groove extending in the circumferential direction is formed. The wall surface of the grinding groove contains abrasive grains of e.g. alumina, silicon carbide, diamond, etc. The particle size (JIS R6001) of the abrasive grains is, for example, at least #120 and at most #2000. The surface chamfered by the grindstone with such a particle size of the abrasive grains becomes a moderately rough surface and will scatter ultraviolet rays, such being preferred. The chamfered shape is preferably a R-chamfered shape.

The total thickness having the thickness of the first glass plate 2 and the thickness of the second glass plate 3 combined, is preferably at most 4.0 mm, more preferably at most 3.6 mm. When the total thickness of the pair of glass plates is at most the above upper limit value, the laminated glass 1 can be made light in weight. The total thickness of the pair of glass plates, is preferably at least 2.5 mm, more preferably at least 3.0 mm. When the total thickness of the pair of glass plates is at least the above lower limit value, the rigidity of the laminated glass 1 will be improved.

When to be used in a vehicle, the laminated glass 1 may have a curved shape. When to be used in the side glass, the radius of curvature in the vertical direction within 100 mm from the outer peripheral edge of the laminated glass 1 is preferably at most 50,000 mm, more preferably at most 40,000 mm, further preferably at most 30,000 mm. When the radius of curvature is within the above range, the outer peripheral edge of the intermediate film 4 tends to be hardly visible, such being preferred from the viewpoint of the appearance. Here, the vertical direction is meant for the direction in a state where the side glass is mounted on the vehicle.

(Intermediate Film)

The intermediate film 4 is such that the shear storage modulus G' is from 2 to 100 MPa. The shear storage modulus G' is a value measured by a common dynamic viscoelasticity measurement method under measuring conditions of a temperature of 20° C., a frequency of 1 Hz and a strain of 0.05%.

The intermediate film 4 is such that in a region within 5 mm inward from the outer peripheral edge, the amount of a plasticizer per unit area of the principal surface of the intermediate film 4 is preferably from 0.05 to 0.22 mg/mm$^2$. When the amount of the plasticizer contained in the edge portion of the intermediate film 4 is at least 0.05 mg/mm$^2$, the sound insulation of the laminated glass 1 can be secured, and when the amount of the plasticizer is at most 0.22 mg/mm$^2$, it is possible to more effectively suppress the bleeding out of the plasticizer, whereby the edge foaming resistance of the laminated glass 1 will be improved.

The intermediate film 4 is preferably such that at least a part of its edge portion, for example, a center of the edge portion, has a U-shape recessed from outside of the edge portion. When at least a part of the edge portion of the intermediated film 4 has a recessed U-shape, the edge portion of the intermediate film 4 will be more effectively protected from heat and ultraviolet rays, whereby it is possible to increase the edge foaming resistance of the laminated glass 1.

The intermediate film 4 preferably has a laminated structure of three or more layers. It is preferred that the intermediate film 4 comprises a laminated structure having a first resin layer, a second resin layer and a third resin layer laminated in this order, wherein the first resin layer, the second resin layer and the third resin layer contain a plasticizer, and the amount of the plasticizer contained in the second resin layer is larger than the amount of the plasticizer contained in the first resin layer or the amount of the plasticizer contained in the third layer. When the first resin layer, the second resin layer and the third resin layer contain a plasticizer, it is possible to increase the adhesion and penetration resistance. The amount of the plasticizer contained in the second resin layer, is preferably larger by at least 10 phr, more preferably at least 20 phr, than the amount of the plasticizer contained in the first resin layer or the third resin layer. When it is at least the above lower limit value, it is possible to improve the sound insulation of the laminated glass 1.

As the plasticizer, an organic ester plasticizer or an organic phosphate plasticizer may be mentioned, and among them, an organic ester plasticizer is preferred.

The above organic ester plasticizer preferably contains di-(2-butoxyethyl)-adipate (hereinafter referred to also as DBEA), triethylene glycol di-2-ethyl hexanoate (hereinafter referred to also as 3GO), triethylene glycol di-2-ethyl butyrate (hereinafter referred to also as 3GH) or triethylene glycol di-2-ethyl propanoate, more preferably contains 3GO, 3GH or triethylene glycol di-2-ethyl propanoate, further preferably contains 3GO or triethylene glycol di-2-ethyl butyrate, particularly preferably contains triethylene glycol di-2-ethylhexanoate.

As the above organic phosphate plasticizer, tributoxyethyl phosphate, isodecyl phenyl phosphate, triisopropyl phosphate, etc. may be suitably used.

As the plasticizer, two or more types may be used in combination.

The plasticizer may contain, in addition to the above, a plasticizer with a high refractive index. By adding a plasticizer with a high refractive index, in a case where the intermediate film 4 has a laminated structure of two or more layers, it is possible to minimize the difference in refractive index among the layers while maintaining the sound insulation. Specific preferred examples of the plasticizer with a high refractive index may be dipropylene glycol dibenzoate, tripropylene glycol dibenzoate, polypropylene glycol dibenzoate, isodecyl benzoate, 2-ethylhexyl benzoate, diethylene glycol benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, bisphenol A bis(2-ethylhexanoate), ethoxylated nonylphenol, nonylphenol tetraethylene glycol, dioctyl phthalate, diisononyl phthalate, di-2-ethylhexyl terephthalate, benzoic acid esters of dipropylene glycol and diethylene glycol, or mixtures thereof.

The second resin layer is such that the content of the plasticizer is preferably at least 50 phr, more preferably from 50 to 60 phr. The first resin layer or the third resin layer is such that the content of the plasticizer is preferably at most 32 phr, more preferably from 24 to 30 phr. When the first resin layer, the second resin layer and the third resin layer have the above contents of the plasticizer, it is possible to satisfy both bending stiffness and sound insulation and edge foaming resistance of the laminated glass 1.

The thickness of the second resin layer is preferably at least 80 μm, more preferably from 100 to 130 μm. The thicknesses of the first resin layer and the third resin layer are preferably from 250 to 450 μm, more preferably from 330 to 360 μm.

The shear storage modulus G' of the second resin layer is preferably from 0.3 to 1.0 MPa, more preferably from 0.3 to 0.7 MPa, further preferably from 0.3 to 0.5 MPa. Within the above range, sound insulation of the laminated glass 1 will be good.

The Young's modulus of the second resin layer is preferably from 1 to 25 MPa. Within the above range, it is possible to secure the impact resistance and sound insulation of the laminated glass 1.

The shear storage modulus G' of the first resin layer and the third resin layer is preferably from 30 to 200 MPa, more preferably from 50 to 180 MPa, further preferably from 75 to 150 MPa. Within the above range, the impact resistance required for the laminated glass will be obtainable.

The Young's modulus of the first resin layer and the third resin layer is preferably from 210 to 1,700 MPa. Within the above range, it is possible to secure the impact resistance against an external force, and the processability.

The first resin layer, the second resin layer and the third resin layer are preferably composed of either a polyvinyl acetal resin or an ethylene vinyl acetate resin, more preferably composed of a polyvinyl butyral resin.

The intermediate film 4 preferably contains at least one type of infrared shielding material selected from the group consisting of a dye, a pigment and a metal oxide. The dye may be a phthalocyanine compound, a naphthalocyanine compound or an anthracyanine compound. The metal oxide may be aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium doped tungsten oxide particles, tin-doped indium oxide particles (ITO particles), tin-doped zinc oxide particles, silicon-doped zinc oxide particles, or lanthanum hexaboride ($LaB_6$) particles. The above infrared shielding material is preferably any one of a phthalocyanine compound, indium-doped tin oxide particles, and cesium-doped tungsten oxide particles. When the intermediate film 4 contains the above infrared shielding material, it is possible to suppress lowering of the visible light transmittance and weather resistance, while reducing the solar transmittance $T_e$.

The intermediate film 4 preferably contains a ultraviolet shielding material. The ultraviolet shielding material may be platinum particles, palladium particles, a compound having a benzotriazole structure or benzophenone structure, zinc oxide, titanium oxide, cerium oxide, etc.

The intermediate film 4 preferably contains a light stabilizer or an antioxidant. The light stabilizer may be a hindered amine. With a hindered amine light stabilizer, when used together with a ultraviolet shielding material having a phenol skeleton or an antioxidant having a phenol skeleton, it is possible to prevent deterioration of the resin due to ultraviolet rays or heat. The hindered amine light stabilizer is preferably used in combination with phosphorus. By the interaction of the hindered amine light stabilizer and phosphorus, the effect to prevent deterioration of the resin due to ultraviolet rays or heat will be further improved.

(Method for Producing Laminated Glass)

The laminated glass 1 may be prepared by known techniques.

A laminated glass precursor having an intermediate film inserted between a pair of glass plates, is prepared. This laminated glass precursor is put in a vacuum bag such as a rubber bag, and while vacuum suctioning so that the pressure in the vacuum bag becomes to be a vacuum degree of from about −65 to −100 kPa, bonded at about 70 to 110° C., whereby it is possible to obtain a laminated glass 1. Then, by conducting pressure bonding treatment for heating and pressurizing under conditions of from 100 to 140° C. and a pressure of from 0.6 to 1.3 MPa, it is possible to obtain a laminated glass 1 having more excellent durability.

(Applications)

The laminated glass 1 may be used as a laminated glass for vehicles, or as a laminated glass for buildings. The laminated glass for vehicles is not limited to the side glass, and may also be used as the front glass or rear glass, but it is preferably the side glass.

EXAMPLES

The present invention will be described in more detail with reference to the following Examples. The present invention is not limited to these Examples.

Example 1

An intermediate film A comprising a laminated structure in which a first resin layer, a second resin layer and a third resin layer were laminated in this order, was prepared in accordance with the construction in Table 2, by coextruding a composition for forming the first resin layer, a composition for forming the second resin layer, and a composition for forming the third resin layer, by using a co-extrusion machine. For each of the first resin layer, the second resin layer and the third resin layer, polyvinyl butyral (PVB) was used. As the plasticizer, triethylene glycol di-2-ethylhexanoate (3GO) was used.

A first glass plate and a second glass plate each made of glass plate A (green-soda-lime glass, thickness: 2.0 mm, manufactured by Asahi Glass Co., Ltd.) of 300 mm in length×300 mm in width, and the intermediate film A, were bonded in accordance with the construction in Table 1, put into a vacuum bag, subjected to vacuum pressure bonding under conditions of temperature: 120° C., pressure: minus one atmosphere, and then subjected to pressure bonding treatment of heating and pressing under conditions of temperature: 130° C., pressure: 1.3 MPa, to obtain a laminated glass. At that time, the positions of the glass plates and the intermediate film at the time of the vacuum pressure bonding were adjusted so as to bring about the state of the protrusion as shown in Table 1. The protruding position of the glass plate A is a part of the upper portion when being mounted on a vehicle is assumed, which accounted for 50% of the upper portion. Here, the upper portion when being mounted on a vehicle is assumed, is meant for such a portion that when the prepared laminated glass sample is set upright to the horizontal ground, the upper side and upper half portions of the two lateral sides are summed up.

Examples 2 to 8, Comparative Examples 1 to 3

A laminated glass was prepared in the same manner as in Example 1, except that the intermediate film was made to have the construction as described in Table 1 and Table 2, the material or thickness of the first glass sheet and the second glass plate was changed, and the laminated glass was made to have the construction as shown in the Table 1.

TABLE 1

| | | Laminated glass | | | | | | | |
|---|---|---|---|---|---|---|---|---|---|
| | | First glass plate | | | Intermediate film | | | | |
| | | Thickness [mm] | Tuv [%] | Te [%] | | G' [MPa] | Amount of plasticizer at edge portion [mg/mm$^2$] | Recess of edge portion | Second glass plate |
| Ex. 1 | Glass plate A | 2.0 | 60 | 70 | Intermediate film A | 2.2 | 0.20 | No | Glass plate A |
| Ex. 2 | | | | | | | | Yes | |
| Ex. 3 | | | | | Intermediate film B | 4.0 | 0.17 | No | |
| Ex. 4 | | | | | | | | Yes | |
| Ex. 5 | Glass plate B | 1.6 | 54 | 68 | | | | Yes | Glass plate B |
| Ex. 6 | Glass plate B | 2.0 | 50 | 63 | Intermediate film C | 2.1 | 0.22 | Yes | Glass plate B |
| Ex. 7 | Glass plate A | 1.6 | 63 | 75 | Intermediate film D | 2.2 | 0.20 | Yes | Glass plate A |
| Ex. 8 | | 2.0 | | 70 | | | | No | |
| Comp. Ex. 1 | Glass plate A | 2.0 | 60 | 70 | Intermediate film A | 2.2 | 0.20 | No | Glass plate A |
| Comp. Ex. 2 | | | | | Intermediate film B | 4.0 | 0.17 | No | |
| Comp. Ex. 3 | Glass plate C | 2.0 | 81 | 88 | Intermediate film B | 4.0 | 0.17 | Yes | Glass plate C |

| | Laminated glass | | | | | | |
|---|---|---|---|---|---|---|---|
| | Second glass plate | | | | Protruding length D of | Protruding position | Plate displacement width E of |
| | Thickness [mm] | Tuv [%] | Te [%] | Te [%] | glass plate [mm] | of glass plate | glass plate [mm] |
| Ex. 1 | 2.0 | 60 | 70 | 52 | 0.5 | Part of upper side | 0.5 |
| Ex. 2 | | | | 52 | 0.3 | Part of upper side + part of lateral side | 0.0 |
| Ex. 3 | | | | 52 | 0.5 | Part of upper side | 0.0 |
| Ex. 4 | | | | 52 | 0.5 | Part of upper side | 0.5 |
| Ex. 5 | 1.6 | 54 | 68 | 48 | 0.2 | Upper side | 0.5 |
| Ex. 6 | 1.3 | 58 | 72 | 48 | 0.4 | Upper side + lateral side | 0.7 |
| Ex. 7 | 1.6 | 63 | 75 | 41 | 0.2 | Upper side | 0.3 |
| Ex. 8 | | | | 41 | 1.1 | Upper side | 0.0 |
| Comp. Ex. 1 | 2.0 | 60 | 70 | 52 | 0.0 | — | 0.0 |
| Comp. Ex. 2 | | | | 52 | 0.0 | — | 0.0 |
| Comp. Ex. 3 | 2.0 | 81 | 88 | 52 | 0.0 | — | 0.0 |

TABLE 2

| | Intermediate film | | | | | | |
|---|---|---|---|---|---|---|---|
| | First resin layer (PVB) | | | Second resin layer (PVB) | | Third resin layer (PVB) | |
| | Amount of plasticizer [phr] | Ultraviolet ray shielding material | Thickness [mm] | Amount of plasticizer [phr] | Thickness [mm] | Amount of plasticizer [phr] | Ultraviolet ray shielding material | Thickness [mm] |
| Intermediate film A | 28 | — | 0.34 | 55 | 0.1 | 28 | — | 0.34 |
| Intermediate film B | 23 | — | 0.35 | 53 | 0.08 | 23 | — | 0.35 |
| Intermediate film C | 30 | — | 0.30 | 50 | 0.2 | 30 | — | 0.30 |
| Intermediate film D | 28 | Cesium tungstate (0.075 wt %) | 0.34 | 55 | 0.1 | 28 | Cesium tungstate (0.075 wt %) | 0.34 |

(Protruding Length D)

The laminated glass was cut vertically as seen in the partial cross-sectional view of FIG. 2, and the cut surface was photographed by a microscope (VHX-5000, manufactured by Keyence Corporation). The shortest distance between the straight line passing through the top edge portion of the first glass plate and being parallel to the thickness direction and the straight line passing through the top edge portion of the intermediate film and being parallel to said straight line, and the shortest distance between the straight line passing through the top edge portion of the second glass plate and being parallel to the thickness direction and the straight line passing through the top edge portion of the intermediate film 4 and being parallel to said straight line, were measured, whereby the shorter distance was taken as the protruding length D. The results are shown in Table 1.

(Plate Displacement Width E)

The laminated glass was cut vertically as seen in the partial cross-sectional view of FIG. 2, and the cut surface was photographed by a microscope (VHX-5000, manufactured by Keyence Corporation). The shortest distance between the straight line passing through the top edge portion of the first glass plate and being parallel to the thickness direction, and the straight line passing through the top edge portion of the second glass plate and being parallel to the thickness direction, was measured and taken as the plate displacement width E. The results are shown in Table 1.

(Ultraviolet Transmittance $T_{uv}$, Solar Transmittance $T_e$)

With respect to a first glass plate and a second glass plate, using an ultraviolet-visible-near-infrared spectrophotometer (Solid Spec-3700, manufactured by Shimadzu Corporation), the ultraviolet transmittance $T_{uv}$ and the solar transmittance $T_e$ were measured. With respect to a laminated glass, the solar transmittance $T_e$ was measured. The results are shown in Table 1.

(Shear Storage Modulus G')

With respect to an intermediate film, the shear storage modulus G' was measured using a rheometer (MCR301, manufactured by Anton Paar) under conditions of a temperature of 20° C., a frequency of 1 Hz and a strain of 0.05%. The results are shown in Table 1.

(Amount of Plasticizer at Edge Portion of Intermediate Film)

An intermediate film having a width of 1 cm cut at a position of 5 mm inside from the edge portion in a plane perpendicular to the principal surface and in a direction parallel to the side surface, was dissolved in THF, to obtain a sample for measurement.

On the other hand, several plasticizer solutions having known concentrations were prepared. The plasticizer solutions having known concentrations were subjected to GPC measurements to obtain an approximate curve in which the amounts of plasticizer and the peak areas were correlated. Next, from the pre-obtained approximate curve, the amount [mg] of plasticizer contained in the edge portion of the sample for measurement was obtained and adopted as the amount of plasticizer per unit area [mg/mm$^2$] on the principal surface of the intermediate film. The results are shown in Table 1.

(Three-Point Bending Stiffness)

With respect to a laminated glass cut into 100 mm in width×300 mm in length, by using a compression tensile tester, the ratio of load to displacement [N/mm] when subjected to displacement at a displacement rate of 1 mm per minute under measurement conditions of a temperature of 23° C. and a span of 200 mm, was measured as a three-point bending stiffness. The results are shown in Table 3.

(Edge Foaming Resistance)

With respect to a laminated glass, by using a sunshine carbon arc lamp type weatherometer (manufactured by Suga Test Instruments Co., Ltd., S80), solar simulated light was irradiated under conditions of a black panel temperature of 83° C. and no rainfall. After the irradiation, the appearance of the above-mentioned upper portion of the laminated glass was visually confirmed. In a case where at the edge portion of the intermediate film, no foaming was observed after irradiation for 5,000 hours, was rated as ⊚, in a case where although no foaming after irradiation for 3,000 hours was observed, foaming with a long diameter of more than 0 mm and at most 1 mm after irradiation for 5,000 hours was observed, was rated as ○, in a case where although no foaming after irradiation for 3,000 hours was observed, foaming with a long diameter exceeding 1 mm after irradiation for 5,000 hours was observed, was rated as Δ, and in a case where foaming with a long diameter exceeding 1 mm after irradiation for 3,000 hours was observed, was rated as x. The results are shown in Table 3.

(Appearance)

The appearance of a laminated glass was visually evaluated. In a case where the edge portion is inconspicuous was rated as ○, and in a case where the edge portion is conspicuous was rated as x. The results are shown in Table 3.

(Sound Transmission Loss STL)

In accordance with SAE J1400, the sound transmission loss (STL) of a laminated glass was measured at 20° C. The results are shown in Table 3.

TABLE 3

|  | Three-point bending stiffness [N/mm] | Edge foaming resistance | Appearance | STL [dB] |
|---|---|---|---|---|
| Example 1 | 120 | ⊚ | ○ | 35.4 |
| Example 2 | 120 | ⊚ | ○ | 35.4 |
| Example 3 | 147 | ○ | ○ | 34.1 |
| Example 4 | 147 | ⊚ | ○ | 34.1 |
| Example 5 | 85 | ⊚ | ○ | 30.3 |
| Example 6 | 92 | ⊚ | ○ | 28.2 |
| Example 7 | 120 | ⊚ | ○ | 35.4 |
| Example 8 | 120 | ⊚ | X | 35.4 |
| Comparative Example 1 | 120 | Δ | ○ | 35.4 |
| Comparative Example 2 | 147 | X | ○ | 34.1 |
| Comparative Example 3 | 120 | X | ○ | 35.4 |

As shown in Examples 1 to 8 in Table 3, a laminated glass in which the outer peripheral edge of the intermediate film was present inside than the outer peripheral edges of two glass plates constituting the pair of glass plates, had rigidity and sound insulation, and was excellent in edge foaming resistance. In particular, the laminated glass in each of Examples 1 to 7 in which the protruding length D of the pair of glass plates was from 0.2 to 1.0 mm, had no problem in appearance as a laminated glass. On the other hand, in the laminated glass in each of Comparative Examples 1 to 3 in which the protruding length D of the pair of glass plates was 0.0 mm, a problem in edge foaming resistance was observed.

INDUSTRIAL APPLICABILITY

The laminated glass of the present invention is a laminated glass which is excellent in edge foaming resistance and rigidity, and thus, it is applied to an automobile, a vehicle for railways, etc. and is particularly preferably applied to an automobile.

This application is a continuation of PCT Application No. PCT/JP2018/028128, filed on Jul. 26, 2018, which is based upon and claims the benefit of priority from Japanese Patent Application No. 2017-147596 filed on Jul. 31, 2017. The contents of those applications are incorporated herein by reference in their entireties.

REFERENCE SYMBOLS

1: laminated glass
2: first glass plate
3: second glass plate
4: intermediate film
5: upper portion
6: lower portion
7: side portion

What is claimed is:

1. A laminated glass in which a pair of glass plates and an intermediate film containing a plasticizer, provided between the pair of glass plates, are laminated, wherein the shear storage modulus of the intermediate film is from 2 to 100 MPa, and the outer peripheral edge of the intermediate film is present inside than the outer peripheral edges of the two glass plates constituting the pair of glass plates, at least at a part of the entire outer periphery of the laminated glass,
wherein the outer peripheral edges of the pair of glass plates define the outer peripheral edge of the laminated glass; and
wherein the shear storage modulus is measured using a rheometer under conditions of a temperature of 20° C., a frequency of 1 Hz and a strain of 0.05%.

2. The laminated glass according to claim 1, wherein the outer peripheral edge of the intermediate film is present inside by from 0.2 to 1.0 mm than the outer peripheral edges of the two glass plates constituting the pair of glass plates.

3. The laminated glass according to claim 1, wherein the intermediate film is such that in a region within 5 mm inward from the outer peripheral edge of the intermediate film, the amount of the plasticizer per unit area of the principal surface of the intermediate film is from 0.05 to 0.22 mg/mm².

4. The laminated glass according to claim 1, wherein said pair of glass plates are such that the ultraviolet transmittance $T_{uv}$ of at least one of the glass plates is at most 65%.

5. The laminated glass according to claim 1, wherein said pair of glass plates are such that the solar transmittance $T_e$ of at least one of the glass plates is at most 75%.

6. The laminated glass according to claim 1, wherein said pair of glass plates are such that the outer peripheral edge of one glass plate is present inside than the outer peripheral edge of the other glass plate, at least at a part of the outer periphery of the laminated glass.

7. The laminated glass according to claim 6, wherein said pair of glass plates are such that the outer peripheral edge of one glass plate is present inside by from 0.2 to 0.8 mm than the outer peripheral edge of the other glass plate.

8. The laminated glass according to claim 7, wherein the outer peripheral edge of the intermediate film is present inside by from 0.2 to 1.0 mm than the outer peripheral edge of the glass plate shorter in distance to the outer peripheral edge of the intermediate film, among the outer peripheral edges of said pair of glass plates.

9. The laminated glass according to claim 1, wherein the intermediate film has a recessed shape at least at a part of the edge portion.

10. The laminated glass according to claim 1, wherein the intermediate film comprises a laminated structure having a first resin layer, a second resin layer and a third resin layer laminated in this order.

11. The laminated glass according to claim 10, wherein the first resin layer, the second resin layer and the third resin layer contain a plasticizer, and the amount of the plasticizer contained in the second resin layer is larger than the amount of the plasticizer contained in the first resin layer or the third resin layer.

12. The laminated glass according to claim 11, wherein the amount of the plasticizer contained in the second resin layer is at least 50 phr, and the amount of the plasticizer contained in the first resin layer or the third resin layer is at most 32 phr.

13. The laminated glass according to claim 1, wherein the intermediate film contains at least one type of infrared shielding material selected from the group consisting of a dye, a pigment and a metal oxide.

14. The laminated glass according to claim 1, which is used as a window glass for a vehicle.

15. The laminated glass according to claim 14, wherein said pair of glass plates are protruded from the outer peripheral edge of the intermediate film, at least at a part of the upper portion when mounted on the vehicle as a laminated glass.

16. The laminated glass according to claim 1, wherein the outer periphery edge of the laminated glass consists of a pair of the glass plates and the intermediate film.

17. The laminated glass according to claim 1, wherein the outer peripheral edge of the intermediate film is present inside by from 0.2 to 0.8 mm than the outer peripheral edge of the glass plate shorter in distance to the outer peripheral edge of the intermediate film, among the outer peripheral edges of said pair of glass plates.

18. The laminated glass according to claim 1, wherein the outer peripheral edge of the intermediate film is present inside by from 0.3 to 0.8 mm than the outer peripheral edge of the glass plate shorter in distance to the outer peripheral edge of the intermediate film, among the outer peripheral edges of said pair of glass plates.

* * * * *